United States Patent [19]
Zavodny, Jr.

[11] 3,786,720
[45] Jan. 22, 1974

[54] REMOVAL OF SURFACE METAL BY SHAVING

[75] Inventor: George Zavodny, Jr., Palos Hills, Ill.

[73] Assignee: La Salle Steel Company, Hammond, Ind.

[22] Filed: Sept. 1, 1972

[21] Appl. No.: 285,897

[52] U.S. Cl. .................... 90/24 R, 82/1 C, 83/170, 29/95.1, 29/106
[51] Int. Cl. ........ B23b 3/00, B23d 1/00, B26d 1/00
[58] Field of Search .......... 82/1, 1 C; 29/106, 95.1; 90/24, 24 A, 24 B, 24 C, 24 D, 24 E, 24 F; 83/170, 171

[56] References Cited
UNITED STATES PATENTS

| 3,168,004 | 2/1965 | Zavodny, Jr. et al. | 90/24 |
| 2,477,411 | 7/1949 | King | 90/24 X |
| 972,436 | 10/1910 | Clark | 29/95.1 X |
| 3,491,651 | 1/1970 | Pascoe | 29/106 |
| 2,161,570 | 6/1939 | Harris | 29/106 X |
| 2,059,236 | 11/1936 | Holslag | 82/1 C X |
| 2,706,234 | 4/1955 | Macy | 82/1 C X |
| 2,706,238 | 4/1955 | Blaser | 83/170 |
| 2,931,263 | 4/1960 | Johnson et al. | 83/170 X |

Primary Examiner—Harrison L. Hinson
Attorney, Agent, or Firm—McDougall, Hersh et al.

[57] ABSTRACT

The removal of surface metal from bars, rods, tubes and the like by the use of a shaving tool which is preheated to elevated temperature to enhance tool life and surface finish of the work processed therethrough.

7 Claims, No Drawings

REMOVAL OF SURFACE METAL BY SHAVING

This invention relates to removal of surface metal from bars, rods, tubes and other members of repeating cross-section by means of a shaving tool which engages the surface to effect removal of material as the work is displaced therethrough.

In the previously issued U.S. Pat. No. 3,168,004, description is made of a process for metal removal by the use of a shaving tool by which the bar, rod or tube is advanced for removal of surface metal as the work is advanced therethrough. As described in the aforementioned patent, the metal is heated in advance of passage through the shaving tool to a temperature sufficient to avoid the buildup of material on the edge of the tool, generally referred to in the trade as "built-up edge." The buildup of metal on the edge of the tool interferes with its cutting efficiency and results in an undesirable surface finish on the work that has been processed through the tool.

More recent investigations have indicated that poor tool life and poor surface finish results from cracking which occurs on the cutting edge of the tool on both the rake and clearance faces of the tool. Such cracking is observed as radial cracks which are initiated after a short period of use of the shaving tool and which increase in number and in intensity, by lengthening and widening, during continued use of the tool. The widening cracks show up as fins on the surface of the work, which requires removal by subsequent, rather expensive, surface conditioning operations.

Soon, such cracking extends to the point where adjacent cracks join and the piece of the cutting edge in between falls out. The result is such unacceptable surface finish on the metal processed through the tool as requires removal and replacement of the shaving tool. This condition may occur within the period of work entailed in the processing of a small number of bars or rods through the shaving tool.

Such short tool life is undesirable not only by reason of the cost of the tool but, more importantly, from the standpoint of the down time of the equipment for replacement of the tool as well as the amount of labor that is required for removal of the inadequate tool and replacement with another. Also, the last work processed through the inadequate tool either requires above average surface condition correcting operations or has to be scrapped.

Thus, it is an object of this invention to provide a means by which the useful life of the shaving tool can be increased with resulting lower tool cost and more efficient utilization of the apparatus as well as better control of the surface finish of the work processed through the tool with subsequently either lower work surface condition correcting costs or lower scrap costs.

It has been found that the foregoing objectives can be achieved by the simple expedient of preheating the shaving tool, separate and apart from or in addition to the heating of the metal work piece as described in the aforementioned patent. Tool life and consistency of quality of work from the standpoint of the finish of the freshly cut surface of the work piece are noticeably improved when the shaving tool is preheated, before each work piece is processed therethrough, to a temperature of at least 500° F and preferably within the range of 500° F to 1,300° F and more preferably to a temperature within the range of 750° F to 1,000° F. While the above applies chiefly to work pieces formed of steel, there is reason to believe that the concept described is equally applicable to metal work pieces generally with preheat of the tool to a temperature as low as 200° F for non-ferrous metals or up to about 1,800° F for such exotic metals as titanium, tungsten, molybdenum and high carbon or high alloy steels.

Tool preheat can be achieved by various conventional means, such as resistance heaters wound about the tool or embedded within the tool or its support, or by means of a heat exchange fluid, such as a molten metal circulated through channels in the tool beyond or at its support.

The improvement that is capable of being achieved by the practice of this invention can best be illustrated by reference to the following example in which tool life was measured by the number of steel bars capable of being processed through the tool to effect removal of surface metal at various preheat temperatures for the shaving tool.

Use was made of steel bars of the same composition having a diameter of 1⅛ inches and a length of about 15 feet. The work was processed through the shaving tool at a linear speed of about 60 feet per minute and the shaving tool was dimensioned to take a radial depth of cut of about 0.020 inch.

One series of bars were processed through the tool at room temperature until the first radial crack appeared. These runs were repeated with the tool preheated to various temperatures up to 1,000°F and the number of bars processed through the tool to first cracking was recorded as representative of the life of the tool under the operating conditions, which were the same except for tool preheat temperature. The results are set forth in the following cable which relates the numbers of bars processed before appearance of the first radial crack, as representative of tool life, versus temperature of the tool before shaving each bar.

| Temperature of shaving tool °F prior to shaving each bar | Tool life in number of bars shaved before appearance of first radial crack |
|---|---|
| Room temperature | 15 |
| 500°F | 31 |
| 750°F | No cracks after more than 70 bars |
| 1000°F | No cracks after more than 70 bars |

It will be seen from the results that the first radial crack developed after only 15 bars had been processed through the tool at room temperature. This number was increased to 31 bars when the tool was preheated to a temperature of 500°F before each bar was shaved.

An unexpectedly marked increase in tool life was experienced when the tool was preheated to a temperature above 500° F. At 750° F and at 1,000° F no cracks were detected after more than 70 bars had been processed through the shaving tool.

The steel bars processed through the shaving tool, at 750° F to 1,000° F, and up to the 31st bar at 500° F, and up to the 15th bar at room temperature, all had acceptable surface qualities which did not necessitate surface refinishing after removal of the surface metal by the shaving tool.

It will be apparent from the foregoing that I have provided a simple technique by which the useful life of the shaving tool can be markedly increased while simultaneously improving the finish of the surface of the metal being worked.

It will be understood that changes may be made in the details of construction, arrangement and operation without departing from the spirit of the invention, especially as defined in the following claims.

I claim:

1. In the process of removal of surface metal from elongate work pieces of repeating cross-section by means of a shaving tool through which the work is processed for continuous removal of surface metal during the relative movement between the work and tool, the improvement wherein the life of the tool is increased and the finish of the freshly cut surface is improved by preheating the tool to elevated temperature before the work is processed therethrough.

2. The process as claimed in claim 1 in which the tool is preheated to a temperature within the range of 200° F to 1,800° F.

3. The process as claimed in claim 1 in which the tool is heated to a temperature of at least 500° F for steel work pieces.

4. The process as claimed in claim 1 in which the tool is heated to a temperature within the range of 500°F to 1,300° F.

5. The process as claimed in claim 1 in which the tool is heated to a temperature above 200° F for non-ferrous metal work pieces.

6. The process as claimed in claim 1 in which the tool is heated to a temperature up to 1,800° F for high melting point metals and alloys.

7. The process as claimed in claim 1 in which the work pieces are in the form of bars, rods and tubing.

* * * * *